(12) United States Patent
Chen et al.

(10) Patent No.: US 6,586,560 B1
(45) Date of Patent: Jul. 1, 2003

(54) ALKALINE SOLUBLE MALEIMIDE-CONTAINING POLYMERS

(75) Inventors: Cindy X. Chen, Andover, MA (US); Rodney Hurditch, Providence, RI (US)

(73) Assignee: MicroChem Corp., Newton, MA (US)

( * ) Notice: Subject to any disclaimer, the term of this patent is extended or adjusted under 35 U.S.C. 154(b) by 0 days.

(21) Appl. No.: 09/954,888

(22) Filed: Sep. 18, 2001

(51) Int. Cl.$^7$ .............................................. C08G 69/08
(52) U.S. Cl. ....................................... 528/310; 528/322
(58) Field of Search ................................ 528/310, 170, 528/322; 430/283.1, 281.1, 270.1; 525/280, 282, 294, 296, 301

(56) References Cited

U.S. PATENT DOCUMENTS

| | | | |
|---|---|---|---|
| 2,146,209 A | 2/1939 | De Witt Graves | 260/2 |
| 3,284,425 A | 11/1966 | Schröder et al. | 260/89.5 |
| 4,048,146 A * | 9/1977 | Wilson | 526/312 |
| 4,246,374 A | 1/1981 | Kopchik | 522/3 |
| 4,636,532 A | 1/1987 | Sandford | 525/329 |
| 4,689,243 A | 8/1987 | Sasaki et al. | 427/54.1 |
| 4,814,258 A | 3/1989 | Tam | 430/315 |
| 4,857,435 A * | 8/1989 | Hopf et al. | 430/192 |
| 5,059,513 A * | 10/1991 | Hopf et al. | 430/326 |
| 5,155,190 A * | 10/1992 | Okinaka et al. | 526/203 |
| 5,264,527 A * | 11/1993 | Varshney et al. | 525/299 |
| 5,319,043 A * | 6/1994 | Shen | 526/262 |
| 5,756,266 A * | 5/1998 | Galvin-Donoghue et al. | 430/323 |
| 6,280,903 B1 * | 8/2001 | Kang et al. | 430/270.1 |
| 6,352,811 B1 * | 3/2002 | Patel et al. | 430/270.1 |
| 6,365,322 B1 * | 4/2002 | Padmanaban et al. | 430/270.1 |
| 6,410,209 B1 * | 6/2002 | Adams et al. | 430/311 |
| 6,416,927 B1 * | 7/2002 | Choi et al. | 430/270.1 |

FOREIGN PATENT DOCUMENTS

| | | |
|---|---|---|
| EP | 0341843 | 11/1989 |
| EP | 794458 A2 * | 9/1997 |

* cited by examiner

*Primary Examiner*—P. Hampton-Hightower
(74) *Attorney, Agent, or Firm*—William A. Simons; Wiggin & Dana

(57) ABSTRACT

An alkaline soluble maleimide tetrapolymer of Formulae I or II prepared by the free radical polymerization of the monomers maleimide, N-alkyl maleimide, (methyl) methacrylate and either (meth)acrylic acid or (meth) acrylate:

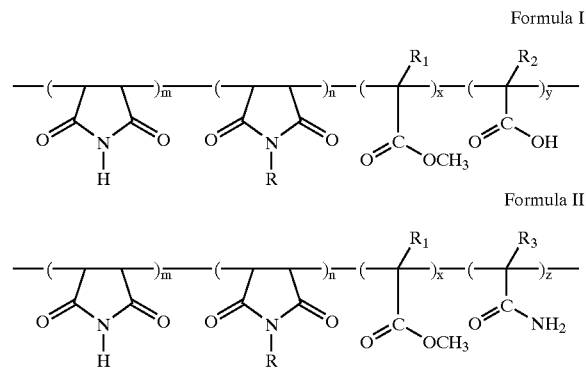

wherein R is an alkyl having I to 4 carbon atoms; each $R_1$, $R_2$ and $R_3$ is individually selected from hydrogen or methyl; each m is the mole fraction of maleimide and has a value of 5 to 20%, each n is a mole fraction of N-alkyl maleimide and has a value of about 50 to 70%, each x is the mole fraction of methyl(meth)acrylate and has a value of about 15 15 to 30%, y is the mole fraction of (meth)acrylic acid and has a value 3 to 12%, and z is the mole fraction of (meth) acrylamide and has a value of about 4 to 15%, wherein the values of m, n, x, y in Formula I and m, n, x and z in Formula II are such that the total nitrogen content of the maleimide tetrapolymer is at least about 6.5% by weight of the polymer.

20 Claims, No Drawings

ALKALINE SOLUBLE MALEIMIDE-CONTAINING POLYMERS

BACKGROUND OF THE INVENTION

1. Field of the Invention

The present invention relates to selected alkaline soluble maleimide tetrapolyrners prepared by the free radical polymerization of maleimide, N-alkyl maleimide, methyl(meth)acrylate and either (meth)acrylic acid or (meth)acrylamide. Furthermore, the present invention relates to their use as non-imageable resists or in anti-reflective coatings in multilevel photolithographic processing or a polymer component in an imageable photoresist.

2. Brief Description of Art

The additive process of depositing patterned metal films is known as the lift-off process or metal lift-off process. There are several variations of the metal lift-off process. Those which are most widely used in practice, for example, to deposit the metallic "read-stripe" in the manufacture of thin film heads for magnetic hard drives, and in the fabrication of the gate metal for GaAs FET devices, involve a bilevel lithographic process which is the subject of the present invention. Variants of the bilevel lift-off process are described in detail in European Patent Application No. 0341843 A2 assigned to International Business Machines Corp., and U.S. Pat. No. 4,814,258 assigned to Motorola Inc.

A solution of a non-imaging lift-off resist is deposited by spin-coating to form a uniform thin film on top of a substrate to be metallized. The lift-off layer is soft-baked by heating at a sufficiently high temperature to remove most of the solvent. A conventional imaging positive resist layer is deposited on top of the lift-off resist. There must be no intermixing between the top resist and the bottom layer. Therefore, the lift-off resist should have a low solubility in conventional positive resist solvents. After a second soft-bake to remove most of the residual solvent in the imaging resist layer, the pattern is transferred from a mask to the resist film using a conventional microlithographic imaging tool such as a contact and proximity printer or stepper. The exposed areas in the resist layer represent the areas to be metallized. The exposed resist is developed through to the lift-off resist layer which then dissolves both vertically through to the substrate and laterally, to penetrate the underneath the unexposed areas of the top resist a small predefined distance to produce a controlled degree of undercut in a development time which is neither too long to make the process impractical or to remove unexposed photoresist, or too short to make the process irreproducible.

In one variation of the multilevel photolithographic process, often referred to as the PCM (portable conformable mask) variation, the underlying lower level resist is photosensitive in the deep ultra-violet (DUV) spectral range and the positive imaging top resist is of the novolak-diazonaphthoquinone type. The latter absorbs in the DUV and acts as a mask to an intermediate DUV flood exposure. This renders the lower level resist more soluble in a selected developer in the exposed areas that are to be removed during the development process.

After the desired degree of undercut is developed in the lower resist layer, the metal layer is blanket-deposited by sputtering. The undercut ensures a discontinuity between the metal on top of the resist and the metal in the trench formed by the lithographic process. By this means, upon subsequent stripping of the remaining top photoresist and the lower resist, the metal deposited on top of the resist is cleanly separated from the metal deposited on the substrate, ensuring consistent profiles and critical dimensions of the metal pattern. The degree of undercut, and hence the lateral dissolution rate, must be carefully controlled.

In any practical lift-off process it is desirable to adjust and maintain precise control of the dissolution rate of the lift-off resist layer, so that the required degree of undercut is always obtained in a relatively short time using a developer which it is compatible with, and provides a wide process latitude for the imaging positive photoresist layer.

In the fabrication of semiconductor devices on highly reflective substrates such as silicon, or metals, a bottom anti-reflective coating which absorbs actinic radiation, thus suppressing standing waves, which is soluble in an alkali developer and is, therefore, easily removed without the need for plasma etching is especially useful. The properties required for a film-forming polymer which is to be used in combination with a dye or other absorber in an alkali soluble anti-reflective coating are very similar to those required for a lift-off resist.

Only one known class of commercially available thermoplastic polymers known as polyglutarimides, especially polydimethylglutarimide (PMGI), have the desirable combination of properties including poor solubility in positive resist solvents such as ethyl lactate, 2-heptanone and propylene glycol methyl ether acetate, good solubility in polar solvents such as cyclopentanone and N-methyl-2-pyrrolidinone, a desirable range of alkaline solubility to give controlled undercut rates with aqueous developers typically used for the development of conventional positive resists, and have a sufficiently high glass transition temperature ideally required for the lower level resist in the above described bilevel process.

Polyglutarimide or polydimethylglutarimide refers to a class of polymers containing partially cyclized imide and N-alkyl imide moieties and uncyclized polymethacrylate ester, in which the degree of cyclization as well as the ratio of N-alkyl to N—H can vary widely depending on the starting materials and the process used in the preparation. PMGI polymers for lift-off applications are generally found to comprise about 65–85% or more of cyclized imide moieties of which about 50–75% are N—H and the remainder N-methyl substituted, and are made commercially by the reaction of ammonia at high pressure with polymethyl methacrylate (PMMA) in a reactive extruder as disclosed in U.S. Pat. No. 4,246,374 (assigned to Rohm and Haas Company). The process conditions required to cause sufficient imidization of PMMA, are severe, requiring anhydrous ammonia at a pressure above 60 atmospheres and a reaction temperature of greater than 300° C. The high reaction temperature can result in partial decomposition of the PMMA resin. Unreacted ammonia and volatile bi-products must be treated and safely disposed of.

The alkaline solubility of PMGI is critically dependent on the degree of imidization, the value of which is sensitive to small variations in the extruder reaction parameters. Thus, it is difficult to obtain a resin composition having a specified uniform alkaline solubility required for a lift-off resist.

PMGI resins produced by this process have a fairly narrow range of alkaline solubility, and exhibit poor adhesion on widely used substrates such as bare silicon, tantalum nitride, gallium arsenide and metals, especially if the bake temperature used is below the glass transition temperature of the PMGI resin film. Additionally, in the case of a lift-off process which requires a small degree of undercut, and hence a low dissolution rate, the use of a high molecular weight PMGI as the lift off-resist it may lead to the formation of residues (scum) due to incomplete solubilization during development. Furthermore, in the case of a lift-off process which requires a large degree of undercut, and hence a high dissolution rate, the use of a high molecular weight PMGI as the lift-off resist and along with a developer compatible with conventional positive resists may not produce the desired degree of undercut.

This limitation creates the need for other methods of modifying the dissolution rate of these PMGI resins. One such method is to reduce the molecular weight of PMGI by exposing the polymer to DUV or electron beam radiation. This method has been described in U.S. Pat. No. 4,636,532 (assigned to Shipley Co.). By this means, the dissolution rate of PMGI, can be increased to some extent. However, the amount of increase in the dissolution rate may be insufficient for certain lift-off processes requiring a relatively large rate of undercut to be useful with certain developers.

The basic reaction to form poly(N-alkylimides) from the reaction of poly(methyl methacrylate)(PMMA) or poly(methacrylic acid) with an amine is disclosed in Graves U.S. Pat. No. 2,146,209, (assigned to E.I. du Pont de Nemours & Co.), see German Patent No. 1,077,872 and Makromol. Chem. 96, 227 (1966).

European Patent Application No. 0275918A (assigned to Verdril S.p.A.) discloses a solution process for making imidized acrylic polymers by reaction of acrylic resin with an amide. U.S. Pat. No. 4,689,243 (assigned to Mitsubishi Rayon Co.) discloses a process for forming polyglutarimide polymers by reaction of a solution of PMMA with ammonia or an amine, followed by separation of the polymer from non-polymeric reaction products and solvents under vacuum in a vent extruder. As described in U.S. Pat. No. 3,284,425, the same reaction is carried out in a suspending solvent in an autoclave. However, none of the above described processes have led to the production of commercial polymers and suffer from the disadvantage of attaining a sufficiently high degree of imidization.

There is, therefore, the need for an alternative class of polymer resins which satisfies the requirements for a lift-off resist, can also be used as an alkali soluble film-forming resin in an anti-reflective coating and can be produced using a process suitable for ease of manufacturing, providing a range of compositions having a wide range of reproducible dissolution rates, a relatively low molecular weight and a $T_g$ higher than the typical bake temperatures used to process conventional positive resists. The present invention offers a solution to that need.

BRIEF SUMMARY OF THE INVENTION

Therefore, one aspect of the present invention is directed to alkaline soluble maleimide tetrapolymers of Formulae I or II prepared by the free radical polymerization of the monomers maleimide, N-alkyl maleimide, methyl(meth)acrylate and (meth)acrylic acid or (meth)acrylamide, Formula I

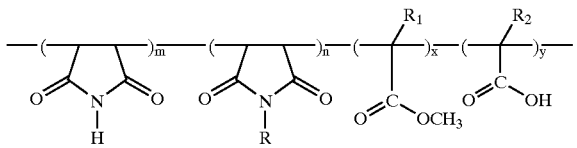

-continued

Formula II

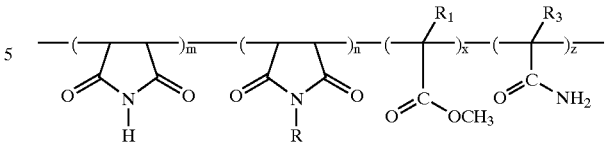

wherein R is an alkyl having 1 to 4 carbon atoms, preferably methyl or ethyl; and each $R_1$, $R_2$ and $R_3$ individually selected from hydrogen or methyl, preferably methyl; each m is the mole fraction of maleimide and has a value of about 5 to 20%, each n is the mole fraction of N-alkyl maleimide and has a value of about 50 to 70%, each x is the mole fraction of methyl(meth)acrylate and has a value of about 15 to 30%, y is the mole fraction of (meth)acrylic acid and has a value of about 3 to 12%, and z is the mole fraction of (meth)acrylamide and has a value of about 4 to 15%, wherein the values of m, n, x and y, in Formula I and m, n, x and z in Formula II are such that the total nitrogen content of the maleimide tetrapolymer is at least about 7.5% by weight of the polymer.

Another aspect of the present invention is directed to compositions which comprise a mixture of at least one solvent and at least one maleimide tetrapolymer which are suitable for use as non-imageable resists in multilevel photolithographic processing.

Another aspect of the present invention is directed to compositions comprising at least one solvent in which at least one maleimide tetrapolymer is the alkali soluble resin in an imaging resist (photoresist), composition containing suitable photosensitizers such as diazonaphthoquinones or photoacid generators of the type used in chemically amplified resists.

Another aspect of the present invention is directed to compositions in which the at least one maleimide tetrapolymer is the alkali soluble resin in a bottom anti-reflective coating composition.

Another aspect of the present invention is directed to composite article which comprises (1) a microelectronic substrate; (2) a lower layer of non-imaging resist, imaging resist or bottom anti-reflective coating described above lying on top of the substrate; and (3) a layer of positive-imaging photoresist lying on top of the layer (2).

It is an advantage of the present invention to provide alkali soluble maleimide tetrapolymers which are readily prepared using commercially available monomers with high yield from solution by conventional free radical polymerization, are readily soluble in polar solvents and form films which do not intermix with conventional positive resists.

Another advantage of the present invention is that a wide range of dissolution rates is readily obtained by adjusting the monomer ratios.

Yet another advantage of the present invention is that a combination of properties are obtained with medium-low molecular weight polymer having good adhesion to a variety of substrates and compatible with a variety of aqueous alkaline developers.

DETAILED DESCRIPTION OF THE INVENTION

The term "methyl(meth)acrylate" is used herein to mean either or both methyl acrylate or methyl methacrylate. The term "(meth)acrylic acid" is used herein to mean either or both acrylic acid or methacrylic acid. The term "(meth)

acrylamide" is used herein to mean either or both acrylamide or methacrylamide.

According to the present invention, selected alkaline soluble maleimide tetrapolymers of Formulae I and II which are suitable for use as the lower non-imaging resist layer in a lift-off process or as anti-reflective coatings in multilevel photolithographic processing are prepared by the free radical polymerization of maleimide, N-alkyl maleimide, methyl (meth)acrylate and either (meth)acrylic acid or (meth) acrylamide,

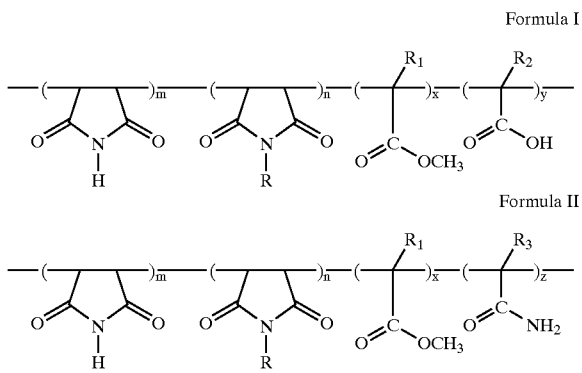

Formula I

Formula II wherein R is an alkyl having 1 to 4 carbon atoms, preferably methyl or ethyl and $R_1$, $R_2$ and $R_3$ are H or methyl selectively, preferably methyl; each m is the mole fraction of maleimide and has a value of 5 to 20%, each n is the mole fraction of N-alkyl maleimide and has a value of about 50 to 70%, each x is the mole fraction of methyl(meth)acrylate and has a value of about 15 to 30%, y is the mole fraction of (meth)acrylic acid and has a value of about 3 to 12%, and z is the mole fraction of (meth)acrylamide and has a value of about 4 to 15%. The range of m in Formulae I and II is from about 5 to 20% by weight with a preferred range of about 10 to 15%. The range of n in Formulae I and II is from about 50 to 70% by weight with a preferred range of about 55 to 65%. The range of x in Formulae I and II is from 15 to 30% by weight with a preferred range of about 20 to 25%. The range of y in Formula I is from about 3 to 12% by weight with a preferred range of about 5 to 8%. The range of z in Formula II is from about 4 to 15% by weight with a preferred range of about 6 to 10%. The values of m, n, x and y, in Formula I and m, n, x, z in Formula II are such that the total nitrogen content of the maleimide tetrapolymers is at least about 7.5% and preferably not more than about 12% by weight with a more preferred range of about 8 to 10%.

A preferred application is for a lift-off resist for thin-film heads, for which the tetrapolymer or a blend of two or more tetrapolymers, or a mixture with a suitable dissolution inhibitor or speed enhancer, has excellent film forming characteristics and is deposited as the bottom layer of a bilevel resist system. Said bottom layer is non-intermixing with the resist forming the top-layer, has good adhesion to the substrate and is homogeneously dissolved by the same alkaline aqueous developer used in imaging the top resist with a preferred dissolution rate in the range of about 0.05 to 0.5 microns per minute and with the absence of scum or residues.

Tetrapolymers of Formula I having acrylic acid as the fourth monomer tend to give relatively high dissolution rates and good adhesion even to an unprimed substrate, whereas tetrapolymers of Formula II having acrylamide as the fourth monomer tend to give relatively lower dissolution rates than of Formula I and generally requires the use of an adhesion promoter. Blends of tetrapolymers of Formula I and Formula II are especially preferred.

Tetrapolymers of Formulae I and II may be preferably prepared using conventional free radical polymerization as described, for example, in Principles of Polymerization, Chapters 3 and 6, by George Odian. Useful free radical initiators are peroxides such as benzoyl peroxide (BPO), hydroperoxides such as cumyl hydroperoxide and azo compounds such as 2,2'-azobis (isobutyronitrile) (AIBN). AIBN and BPO are preferred. AIBN is most preferred because it reduces the possibility of side reactions and results in a lower polydispersivity polymer. The quantity of initiator typically used is preferably from about 0.03 to about 0.2 percent by weight of the monomers employed, more preferably about 0.07 to 0.1% by weight.

Suitable reaction solvents are aprotic liquids which readily dissolve all of the monomers and catalyst at concentrations of about 5 weight percent. Preferred solvents for tetrapolymers of Formula I are toluene and chlorobenzene. The preferred solvent for polymers of Formula II is tetrahydrofuran. Other solvents that are usefull as single solvents or cosolvents are bromobenzene, dimethoxyethane, acetonitrile, proprionitrile and the like. The concentration of monomers in the solvent is preferably about 5–30 percent by weight, more preferably about 10–20%. The preferred reaction temperature range will depend on the chosen solvent and is typically 50–100° C. Using tetrahydrofuran as the solvent the reaction temperature is the reflux temperature, using chlorobenzene the reaction temperature is from about 70 to 90° C.

Blends of two or more tetrapolymers or mixtures of one or more tetrapolymer with dissolution rate modifiers which may act as inhibitors or speed enhancers are most useful to achieve a target dissolution rate. Suitable speed enhancers which are particularly useful for blending with tetrapolymers of Formula II are polyhydroxy aromatic compounds which are non-subliming, have a melting point of >150° C. and dissolve readily in solvents which are compatible with the tetrapolymer resin. Preferred speed enhancers are polyhydroxy aromatic compounds such as polyhydroxy benzophenones containing 4 or 6 phenolic OH groups, polyhydoxyphenylethanes containing at least three phenolic OH groups or hexahydroxybspirobiindane.

Additionally selected alkaline soluble actinic absorbing dyes such as curcumin, monoazo dyes containing one or more phenolic hydroxy groups such as sudan orange G, and bisazo dyes containing phenolic hydroxy groups such as oxybis(hydroxyazobenzene) may be suitable as speed enhancers with these polymers.

Additionally mixtures with relatively high concentrations (>30%) of actinic absorbers providing films having a high absorbance at 365 nm and 248 nm are useful both as lift-off resists and alkali developable bottom anti-reflective coatings.

Suitable inhibitors which are non-subliming, have a melting point of >150° C. and dissolve readily in solvents which are compatible with the tetrapolymer resin are benzanthrone, alpha-naphthoflavone and 4,4'-(4,4'-isopropropylidenediphenoxy)bis (N-methylphthalimide).

Other additives or blend partners which may be used to modify the dissolution rate of the tetrapolymers are phenolic resins, especially those based on cresols such as a meta:para cresol novolacs, polyhydroxystyrene, copolymers of acrylates and methacrylates with maleic anhydride, meythacrylic or acrylic acid and the like.

Selected dyes may be added to the tetrapolymers, blends of the tetrapolymers or mixtures with speed enhancers or inhibitors to modify the absorbance characteristics at a desired wavelength.

Suitable solvents useful for dissolving tetrapolymers of the present invention include polar amide solvents such as dimethylformamide and N-methyl-2-pyrrolidinone, ketonic solvents such as cyclopentanone, 2-pentanone and 2,4-pentanedione, cyclic ethers such as 1,3-dioxolane and tetrahydrofuran, cyclic keto-ethers such as gamma-butyrolactone, hydroxylic polar solvents such as tetrahydrofurfuryl alcohol; and mixtures of the above.

Any one or more of the above solvents may be combined with solvents which alone may not dissolve the terapolymers such as ethyl lactate, propyleneglycolmethylether, proyleneglycolmethylether acetate, methylamyl ketone, cyclohexanone, methylmethoxy propionate, ethylethoxypropionate and the like.

Preferred solvent systems are those which give uniform striation-free, pinhole free coatings, and are cyclopentanone, mixtures are cyclopentanone/propyleneglycolmethyl, cyclopentanone/N-methyl-2-pyrrolidinone, ether, and cyclopentanone/tetrahydrofurfuryl alcohol, in which the cyclopentanone comprises more than 70% of the mixed solvents. Most preferred is cyclopentanone as a single solvent.

Other additives, well known to those skilled in the art, which may be optionally used to improve the coating quality of a spin-coating resist formulation include leveling agents, wetting agents and adhesion promoters.

A spin coating solution of a resist is formed by dissolving the tetrapolymer resin, resin mixture, dissolution rate modifier and other additives if used in the selected coating solvent system. The resin is typically dissolved in the solvent system to a concentration of about 5 to 25 weight percent. The dissolution rate modifier is typically present in an amount of about 5 to 50% of the total solids present in the solution. The solution is filtered through a polypropylene or Teflon filter to remove particulate matter. The resist is deposited by spin-coating the solution onto a substrate to form a uniform layer of thickness 0.05–5 microns, preferably 0.05–0.5 microns. In a lift off application or as an anti-reflective coating this is the bottom non-imaging layer of a bilevel or multilevel resist system. The substrate materials are typically silicon, silicon germanium, gallium arsenide, indium phosphide, ceramic quartz or glass which may have deposited on their surface other materials such as silicon oxide, silicon nitride, various metals, or alloys including magnetic alloys such as NiFe. The bottom resist layer is soft-baked by heating on a hot-plate or in a convection oven to a temperature of 140–200° C. and preferably from 150–170° C.

The imaging photoresist layer is deposited on top of the bottom non-imaging resist layer of the present invention to a uniform thickness of 0.5 to 5.0 microns. The imaging photoresist is usually a commercial positive resist of the type commonly used in the manufacture of semiconductor devices, either of the nonvolak-diazonaphthoquinone or chemically amplified type. The top imaging photoresist layer must not intermix with the imaging resist layer. The photoresist layer is exposed through a photomask containing the pattern to be transferred. The photoresist layer is soft-baked by heating to a temperature of 90–130° C. to remove most of the residual solvent, the pattern is transferred from a mask to the resist film using a conventional microlithographic imaging tool such as a contact and proximity printer or a stepper or a projection stepper.

The exposing radiation is in the wavelength range 200–450 nm and may comprise a broad band or a narrow band, depending on the type of imaging tool required to a transfer an image of the pattern on the photomask at the desired resolution. Narrow wavelength bands corresponding to the spectral output of a mercury or mercury-xenon lamp or an excimer laser. Preferred narrow bands are at 408, 435, 365, or 248 nm.

Suitable developers are commercially available aqueous alkaline developers such as tetramethyl ammonium hydroxide, and metal ion containing such as sodium hydroxide, potassium hydroxide, potassium carbonate and the like. A preferred developer composition contains 2.38% tetramethyl ammonium hydroxide in deionized water (DI) water to which a surfactant may be added. Preferred commercial developers are Shipley LDD26W and AZ 400 diluted 1:4 with DI water.

The present invention is further described in detail by means of the following Examples and Comparisons. All parts and percentages are by weight and all temperatures are degrees Celsius unless explicitly stated otherwise.

EXAMPLE 1

A) Synthesis

A tetrapolymer of Formula I in which R is ethyl and $R_1$ and $R_2$ are methyl (polymer A of Table 1) was prepared by the following method: 100 ml of chlorobenzene was transferred to a flask having an inner volume of 250 ml and provided with a heating mantle, a condenser and a magnetic stirrer. The solvent was purged with nitrogen for about 30minutes. Maleimide, 0.61 g (12.2 mole %), N-ethylmaleimide 3.72 g (57.8 mole%), methyl methacrylate, 1.13g (21.9 mole %) and methacrylic acid 0.36 g (8.1 mole %) were added. Stirring and purging by nitrogen to remove traces of absorbed oxygen was continued for 2 hrs. Azoisobutyronitrile (AIBN), (0.0577 g) was added and the temperature was raised to about 80–90C and maintained constant with stirring for 18 hrs. After cooling the solution, the polymer was precipitated in petroleum ether and the wet powder isolated by vacuum filtration. Drying under vacuo was continued for 12 or more hours. The yield was approximately 85%. The polymer composition was confirmed by $^1$H-NMR and Elemental analysis (C%: 56.4; H%: 6.0; N%: 7.9). The $T_g$ of the resulting polymer was determined by Differential Scanning Calorimetry (DSC) to be 200.4° C.

B) Formulation and Testing

A solution comprising 9.37% by weight of the polymer thus obtained and 90.63 wt % of cyclopentanone as the solvent was prepared by rolling on ajar roller for 4 hours followed by filtration through a 0.20 micron polypropylene (Supor) filter. A uniform coating of the solution of 4320 Angstroms in thickness was deposited onto an unprimed silicon wafer by spin coating. The coated wafer was soft-baked on a hot plate at 165° C. for 3 minutes. The film thickness was determined using a Nanospec thin film reflective interferometric microscope. A second photoresist layer (imaging layer) comprising a uniform coating of Sumitomo PFI81 A7 positive resist (supplied by Sumitomo Chemical) of approximately 0.6 micron in thickness was deposited by spin-coating on top of the of the first layer. The coated wafer was soft-baked on a hotplate at 115° C. for 1 minute. The coating was examined for the presence intermixing which results in an interference pattern, having the appearance of circular bands radiating from the center of the substrate, which is easily observed by viewing the coated substrate in reflection under a narrow band visible light source. No intermixing was observed to have occurred. The wafer was then placed in proximity to a resolution mask comprising an array of square features having a range of dimensions in the range of 2 to 20 microns, and exposed for a predetermined time to a collimated light beam produced from a Mercury Xenon light source providing uniform radiation in the range of wavelengths 330–450nm. The exposure time was that required to replicate the dimensions of the mask features in the developed resist film. The exposed resist film was developed in LDD26W developer (supplied by Shipley of Marlborough, Mass.) for 90 seconds. The length of undercut of a positive feature resulting from lateral dissolution of the polymer film was measured by cross-sectional Scanning Electron Microscope (SEM) analysis and found to be 1.5 microns giving a lateral dissolution rate (undercut rate) of 1.0 microns per minute. The undercut profile was smooth and free of scum, and the tetrapolymer film showed excellent adhesion of the to the substrate.

EXAMPLE 2

A) Synthesis

A tetrapolymer of Formula I in which R is ethyl and $R_1$ and $R_2$ are methyl (polymer B of Table 1) was prepared by the method according to Example I except that maleimide was present in an amount of 1.31 g (13.1 mole %), N-ethylmaleimide in an amount of 7.66 g (59.5 mole %), methyl methacrylate in an amount of 2.12 g (20.6 mole %), methacrylic acid was present in an amount of and 0.61 g (6.9 mole %) and the amount of AIBN was 0.1642 g. The yield was approximately 100%. The polymer composition was confirmed by $^1$H-NMR and Elemental analysis (C%: 56.1; H%: 6.0; N%: 8.6). The $T_g$ of the polymer was determined by DSC to be 198.3° C.

B) Formulation and Testing

The formulation and testing procedure according to Example 1 was repeated except that the polymer B concentration was 8.96%, the film thickness was 5137 Angstroms and the develop time was 15 seconds. No intermixing was observed to have occurred. The lateral dissolution rate was determined by SEM analysis to be 4.8 microns per minute. The undercut profile was smooth and free of scum, and the tetrapolymer film showed excellent adhesion of the to the substrate.

EXAMPLE 3

A) Synthesis

A tetrapolymer of Formula I in which R is ethyl and $R_1$ and $R_2$ are methyl (polymer C of Table 1) was prepared by the method according to Example I except that maleimide was present in an amount of 1.26 g (12.9 mole %), N-ethyl maleimide in an amount of 7.51 g (59.8 mole %), methyl methacrylate in an amount of 2.10 g (20.9 mole %), methacrylic acid was present in an amount of and 0.55 g (6.4 mole %) and the amount of AIBN was 0.164 g. The yield was approximately 99%. The polymer composition was confirmed by $^1$H-NMR and Elemental analysis (C%: 56.2; H%: 5.8; N%: 7.9). The $T_g$ of the polymer was determined by DSC to be 213.6° C.

B) Formulation and Testing

The formulation and testing procedure according to Example 1 was repeated except that the polymer C concentration was 8.0%, the film thickness was 3314 Angstroms and the develop time was 60 seconds. No intermixing was observed to have occurred. The lateral dissolution rate was determined by SEM analysis to be 1.9 microns per minute. The undercut profile was smooth and free of scum, and the tetrapolymer film showed excellent adhesion of the to the substrate.

EXAMPLE 4

A) Synthesis

A tetrapolymer of Formula 1 in which R is ethyl and $R_1$ and $R_2$ are methyl (polymer D of Table 1) was prepared by the method according to Example 1 except that maleimide was present in an amount of 2.52 g (13.8 mole %); N-ethylmaleimide in an amount of 13.33 g (56.5 mole %), methyl methacrylate in an amount of 4.00 g (21.2 mole %), methacrylic acid was present in an amount of and 1.39 g (8.6 mole %) and the catalyst was BPO which was present in an amount of 0.452 g. The yield was approximately 90%. The polymer composition was confirmed by $^1$H-NMR and Elemental analysis (C%: 54.8; H%: 5.4; N%: 8.5).

B) Formulation and Testing

The formulation and testing procedure according to Example 1 was repeated except that the polymer D concentration was 8%, the film thickness was 3446 Angstroms. No intermixing was observed to have occurred the develop time was 15 seconds. The undercut was observed by top-down inspection using a measuring microscope and the lateral dissolution rate was estimated to be about 6 microns per minute. The undercut profile was free of scum, and the tetrapolymer film showed excellent adhesion of the to the substrate.

EXAMPLE 5

A) Synthesis

A tetrapolymer of Formula II in which R is ethyl and $R_1$ and $R_3$ are methyl (polymer E of Table 1) in which R is ethyl was prepared by the following method. 100 ml of tetrahydrofuran was transferred to a flask having an inner volume of 250 ml and provided with a heating mantle, a condenser and a magnetic stirrer. The solvent was purged with nitrogen for about 30 minutes. Maleimide, 1.26 g (13.0 mole %), N-ethylmaleimide 7.44 g (59.4 mole %), methyl methacrylate, 2.01 g (20.1 mole %) and methacrylamide 0.64 g (7.5 mole %) were added. Stirring and purging by nitrogen to remove traces of absorbed oxygen was continued for 2 hrs. AIBN, 0.164 g was added and the temperature was raised until reflux occurred. Refluxing and stirring was continued for 18 hrs. After cooling the solution, the polymer was precipitated in hexane and the wet powder isolated by vacuum filtration. Drying under vacuo was continued for 12 or more hours. The yield was approximately 100%. The polymer composition was confirmed by $^1$H-NMR and Elemental analysis (C%: 57.1; H%: 6.4; N%: 8.9).

B) Formulation and Testing

The formulation and testing procedure according to Example 1 was repeated except that the polymer E concentration was 8.0%, the film thickness was 2018 Angstroms, the develop time was 3 minutes. No intermixing was observed. The undercut was observed by top-down inspection using a measuring microscope and the lateral dissolution rate was estimated to be about 0.03 microns per minute. The undercut profile was free of scum, and the tetrapolymer film showed excellent adhesion of the to the substrate.

EXAMPLE 6

A) Synthesis

A tetrapolymer of Formula II in which R is ethyl and $R_1$ and $R_3$ are methyl (polymer F of Table 1) was prepared by the method according to Example 5 except that methyl methacrylate was present in an amount of 2.05 g (20.4 mole %) and methacrylamide was present in an amount of 0.64 g (7.5 mole %). The yield was approximately 99%. The polymer composition was confirmed by $^1$H-NMR and Elemental analysis (C%: 56.4; H%: 6.3; N%: 8.8). The $T_g$ of the polymer was determined by DSC to be 213.6° C.

B) Formulation and Testing

The formulation and testing procedure according to Example 1 was repeated except that the polymer F concentration was 7.8%, the silicon substrate was primed by spin-coating with a solution of Z-6011 primer supplied by Dow Corning, the film thickness was 2873 Angstroms and the develop time was 3 minutes. The lateral dissolution rate was determined microscopic inspection to be 0.05 um per minute. The undercut profile was free of scum, and the tetrapolymer film showed excellent adhesion of the to the substrate.

EXAMPLE 7

A) Synthesis

A tetrapolymer of Formula II in which R is ethyl and $R_1$ is methyl and $R_3$ is hydrogen (polymer G of Table 1) was prepared by the method according to Example 5 except that, maleimide was present in an amount of 1.29 g (13 mole %); N-ethylmaleimide in an amount of 7.54 g (59.2 mole %); methyl methacrylate was present in an amount of 2.34 g (22.9 mole %) and acrylamide was present in an amount of 0.42 g (4.8 mole %). The yield was approximately 99%. The polymer composition was confirmed by $^1$H-NMR and Elemental analysis (C%: 56.9; H%: 6.3; N%: 8.6).

B) Formulation and Testing

The formulation and testing procedure according to Example 1 was repeated except that the polymer G concentration was 8.9%, the film thickness was 3487 Angstroms and the develop time was 3 minutes. The lateral dissolution rate was determined by SEM analysis to be 0.01 um per minute. The undercut profile was free of scum, and the tetrapolymer film showed excellent adhesion to the substrate.

EXAMPLE 8

A) Synthesis

A tetrapolymer of Formula II in which R is ethyl, $R_1$, is methyl and $R_3$ is hydrogen (polymer H of Table 1) was prepared by the method according to Example 5 except that, maleimide was present in an amount of 1.26 g (13.1 mole %); N-ethylmaleimide in an amount of 7.12 g (57.6 mole %); methyl methacrylate was present in an amount of 2.05 g (20.7 mole %) and acrylamide was present in an amount of 0.72 g (8.6 mole %). The yield was approximately 85%. The polymer composition was confirmed by $^1$H-NMR and Elemental analysis (C%: 55.7; H%: 5.8; N%: 10.84).

B) Formulation and Testing

The formulation and testing procedure according to Example 1 was repeated except that the polymer H concentration was 7.8%, the film thickness was 2942 Angstroms and the develop time was 15 seconds. No intermining was observed. The lateral dissolution rate was determined by microscopic inspection to be >10 um per minute. The undercut profile was free of scum, and the tetrapolymer film showed excellent adhesion to the substrate.

EXAMPLE 9

A) Synthesis

A tetrapolymer of Formula II in which R is ethyl, $R_1$, is methyl and $R_3$ is hydrogen (polymer J of Table 1) was prepared by the method according to Example 5 except that, maleimide was present in an amount of 1.26 g (13.1 mole %); N-ethylmaleimide in an amount of 7.17 g (57.6 mole %); methyl methacrylate was present in an amount of 2.07 g (20.8 mole %) and acrylamide was present in an amount of 0.72 g (8.5 mole %) and the initiator was benzoyl peroxide and was present in amount of 0.2420 g and the solvent was CBZ. The yield was approximately 99%. The polymer composition was confirmed by $^1$H-NMR and Elemental analysis (C%: 56.6; 6.2%: 7.8%).

B) Formulation and Testing

The formulation and testing procedure according to Example 1 was repeated except that the polymer J concentration was 8.3%, the film thickness was 3129 Angstroms and the develop time was 3 minutes. No intermixing was observed. The lateral dissolution rate was determined by microscopic inspection to be >0.01 um per minute. The undercut profile was free of scum, and the tetrapolymer film showed excellent adhesion to the substrate.

EXAMPLE 10

A) Synthesis

A tetrapolymer of Formula I in which R, $R_1$, and $R_2$ are methyl (polymer K of Table 1) was prepared by the method according to Example I except that, maleimide was present in an amount of 0.61 g (12.5 mole %); N-methylmaleimide in an amount of 3.29 g (59.5 mole %); methyl methacrylate was present in an amount of 1.13 g (22.5 mole %) and methacrylic acid was present in an amount of 0.24 g (5.5 mole %). The yield was approximately 95%. The polymer composition was confirmed by $^1$H-NMR and Elemental analysis (C%: 54.9; H% 5.5: N%: 8.0).

B) Formulation and Testing

The formulation and testing procedure according to Example 1 was repeated except that the polymer K concentration was 9.0%, the film thickness was 4122 Angstroms and the develop time was 15 seconds. No intermixing was observed. The lateral dissolution rate was determined by SEM analysis to be >10 um per minute. The undercut profile was free of scum, and the tetrapolymer film showed excellent adhesion to the substrate.

TABLE 1

| Example No. | Polymer No. | Mole % of Monomer Components charged | | | | | | Elemental Analysis | | | undercut rate |
|---|---|---|---|---|---|---|---|---|---|---|---|
| | | MI | EMI | MMI | MMA | MAA | MAM | % C | % H | % N | um/min |
| 1 | A | 12.2 | 57.8 | | 21.9 | 8.1 | | 56.4 | 6.0 | 7.9 | 1.0 |
| 2 | B | 13.1 | 59.5 | | 20.6 | 6.9 | | 56.1 | 6.0 | 8.6 | 4.8 |
| 3 | C | 12.9 | 59.8 | | 20.9 | 6.4 | | 56.2 | 5.8 | 7.9 | 1.9 |
| 4 | D | 13.8 | 56.5 | | 21.2 | 8.6 | | 54.8 | 5.4 | 8.5 | ≈6 |
| 5 | E | 13.0 | 59.4 | | 20.1 | | 7.5 | 57.1 | 6.4 | 8.9 | ≈0.03 |
| 6 | F | 12.9 | 59.2 | | 20.4 | | 7.5 | 56.4 | 6.3 | 8.8 | 0.05 |
| 7 | G | 13.0 | 59.2 | | 22.9 | | 4.8 | 56.9 | 6.3 | 8.6 | 0.01 |
| 8 | H | 13.1 | 57.6 | | 20.7 | | 8.6 | 55.7 | 5.8 | 10.8 | >10 |
| 9 | J | 13.1 | 57.6 | | 20.8 | | 8.5 | 56.6 | 6.2 | 7.8 | <0.01 |
| 10 | K | 12.5 | | 59.5 | 22.5 | 5.5 | | 54.9 | 5.5 | 8.0 | >10 |

MI = maleimide,
EMI = ethylmaleimide,

TABLE 1-continued

| Example No. | Polymer No. | Mole % of Monomer Components charged | | | | | | Elemental Analysis | | | undercut rate |
|---|---|---|---|---|---|---|---|---|---|---|---|
| | | MI | EMI | MMI | MMA | MAA | MAM | % C | % H | % N | um/min |

MMI = methylmaleimide,
MMA = methyl methacrylate,
MAA = methacrylic acid,
MAM = methacrylamide,
AM = acrylamide

EXAMPLE 11

A solution having a total solid concentration of 8.0% comprising a blend of 90% by weight of the polymer of Example 4 (polymer D of Table 1) and 10% by weight of the polymer of Example 6 (polymer F of Table 1) was formulated and tested according to the method of Example 1. The average film thickness was 2700 Angstroms and the develop time was 30 seconds. No intermixing was observed. The undercut was observed by top-down inspection using a measuring microscope and the lateral dissolution rate was determined to be 2 microns per minute. The undercut profile was free of scum, and the tetrapolymer blend film showed excellent adhesion to the substrate.

EXAMPLE 12

A solution having a total solid concentration of 8.25% comprising a blend of 80% by weight of the polymer of Example 6 (polymer F of Table 1) and 20% by weight of the polymer of Example 3 (polymer C of Table 1) was formulated and tested according to the method of Example 1. The average film thickness was 3664 Angstroms and the develop time was 1 minute. The undercut was observed by top-down inspection using a measuring microscope and the lateral dissolution rate was determined to be 0.5 microns per minute. The undercut profile was free of scum, and the tetrapolymer blend film showed excellent adhesion to the substrate.

EXAMPLE 13

A solution having a total solid concentration of 8.1% comprising a blend of 80% by weight of the polymer of Example 5 (polymer E of Table 1) and 20% by weight of the polymer of Example 3 (polymer C of Table 1) was formulated and tested according to the method of Example 1. The average film thickness was 3500 Angstroms and the develop time was 1 minute. No intermixing was observed. The undercut was observed by top-down inspection using a measuring microscope and the lateral dissolution rate was determined to be 0.3 microns per minute. The undercut profile was free of scum, and the tetrapolymer blend film showed excellent adhesion to the substrate.

EXAMPLE 14

A lift-off resist composition comprising a mixture of 0.4% by weight of a dissolution rate enhancing additive 2,3,4,3', 4',5'-hexahydroxybenzophenone supplied by St Jean Photochemical Corp of St Jean Canada present in an amount of 5% of the total weight of solids, and 8.0 wt % of the polymer of Example 6 (polymer F of Table 1) having a weight average molecular weight of 32k, and 91.6 wt % of cyclopentanone, was prepared by rolling on ajar roller for 1–2 hours until the solution was completely clear, followed by filtration through a 0.20 micron polypropylene (Supor) filter. The experimental procedure to determine the rate of undercut described above was followed. After soft-baking at 165° C. the average film thickness was 2452 Angstroms. Sumitomo PFi81-A7 was used as the positive photoresist which showed no intermixing with the lift-off resist layer. After subsequent exposure and development in Shipley LDD26W developer for 1 minute, the undercut was determined to be about 3 microns per minute and the undercut regions showed no evidence of scum. The tetrapolymer, polymer F, alone showed less than one micron of undercut in about 5 minutes.

EXAMPLE 15

The method according to Example 14 was repeated except that the polymer was the polymer of Example 3 (polymer C of Table 1) having a weight average molecular weight ($M_w$) of 40,000 and the additive was a dissolution rate inhibiting additive 4,4'-(4,4'-isopropropylidenediphenoxy)bis (N-methylphthalimide) supplied by Aldrich Chemical Co. The average film thickness was 2693 Angstroms. The photoresist showed no intermixing with the lift-off layer. After 90 seconds development time the undercut was determined to be about 0.7 microns per minute and the undercut regions showed no evidence of scum. The tetrapolymer, polymer C alone, showed an undercut rate of about 2 microns per minute.

EXAMPLE 16

The method according to Example 14 was repeated except that the polymer was a blend of five separate lots of approximately equal proportion, each prepared using the same conditions as described in Synthesis Example 1 and had a weight average molecular weight ($M_w$) of 36,000. The average film thickness was 2436 Angstroms. The photoresist showed no intermixing with the lift-off layer. After 90 seconds development time the undercut was determined to be about 0.7 microns per minute and the undercut regions showed no evidence of scum.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. An alkaline soluble maleimide tetrapolymer of Formulae I or II prepared by the free radical polymerization of the monomers maleimide, N-alkyl maleimide, methyl(meth) acrylate and either (meth)acrylic acid or (meth)acrylamide:

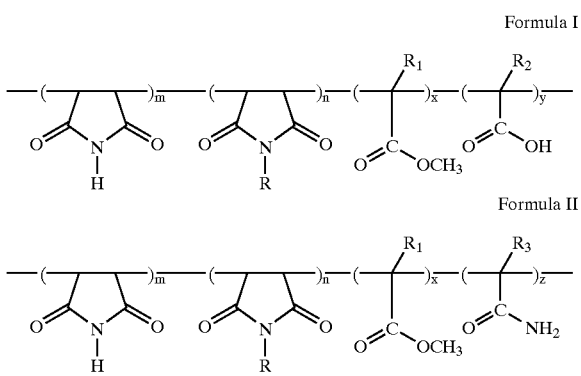

Formula I

Formula II wherein R is an alkyl having 1 to 4 carbon atoms; each $R_1$, $R_2$ and $R_3$ is individually selected from hydrogen or methyl; each m is the mole fraction of maleimide and has a value of 5 to 20%, each n is a mole fraction of N-alkyl maleimide and has a value of about 50 to 70%, each x is the mole fraction of methyl(meth)acrylate and has a value of about 15 to 30%, y is the mole fraction of (meth)acrylic acid and has a value 3 to 12%, and z is the mole fraction of (meth)acrylamide and has a value of about 4 to 15%, wherein the values of m, n, x, y in Formula I and m, n, x and z in Formula II are such that the total nitrogen content of the maleimide tetrapolymer is at least about 7.5% by weight of the polymer.

2. The tetrapolymer of claim 1 wherein R is either methyl or ethyl.

3. The tetrapolymer of claim 1 wherein each $R_1$, $R_2$ and $R_3$ is methyl.

4. The tetrapolymer of claim 1 wherein m is 10 to 15%.

5. The tetrapolymer of claim 1 wherein n is from about 55 to 65%.

6. The tetrapolymer of claim 1 wherein x is from about 20 to 25%.

7. The tetrapolymer of claim 1 wherein y is from about 5 to 8%.

8. The tetrapolymer of claim 1 wherein z is about to 10%.

9. The tetrapolymer of claim 1 wherein the values of m, n, x and y in Formula I or m, n, x and z in Formula II are such that the total nitrogen content of the tetrapolymer is not more than about 12% by weight.

10. The tetrapolymer of claim 1 wherein the values of m, n, x and y in Formula I or m, n, x and z in Formula II are such that the total nitrogen content in the tetrapolymer is from about 8% to about 10%.

11. A composition which is useful as a non-imageable resist in multilevel photolithographic processing comprising a mixture of at least one solvent and at least one maleimide tetrapolymer of claim 1.

12. The composition of claim 11 wherein at least one maleimide tetrapolymer is a mixture of a tetrapolymer of Formula I with a tetrapolymer of Formula II.

13. A composition useful as a bottom anti-reflective coating composition comprising at least one solvent and at least one maleimide tetrapolymer of claim 1.

14. A composition useful as an imaging resist comprising at least one solvent, at least one maleimide tetrapolymer of claim 1, and at least one photosensitizer.

15. The composition of claim 14 wherein the photosensitizer is selected from the group consisting of diazonaphthoquinones and photoacid generators.

16. A composite article which comprises (1) a microelectronic substrate; (2) a lower layer of non-imaging resist, imaging resist or bottom anti-reflective coating that comprises the maleimide tetrapolymer of claim 1; and (3) a layer of positive-imaging photoresist lying on top of layer (2).

17. The composite article of claim 16 wherein the substrate is selected from the group consisting of gallium arsenide, indium phosphide, silicon, silicon germanium, ceramic, quartz and glass.

18. The composite article of claim 17 wherein an oxide, a nitride, a metal or an alloy is deposited upon the gallium arsenide, indium phosphide, silicon, silicon germanium, ceramic, quartz or glass.

19. The composite article of claim 16 wherein the bottom coating layer has a uniform thickness of about 250 to about 10,000 Angstroms.

20. The composite article of claim 16 wherein the layer of positive-imaging photoresist has a uniform thickness of about 0.5 to about 1.5 microns.

* * * * *